US010222110B2

(12) United States Patent
Mitchell et al.

(10) Patent No.: US 10,222,110 B2
(45) Date of Patent: Mar. 5, 2019

(54) ICE MAKER WITH A RADIAL AND THRUST BEARING

(71) Applicant: General Electric Company, Schenectady, NY (US)

(72) Inventors: Alan Joseph Mitchell, Louisville, KY (US); Bart Andrew Nuss, Fisherville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 20 days.

(21) Appl. No.: 15/045,397

(22) Filed: Feb. 17, 2016

(65) Prior Publication Data

US 2017/0234593 A1   Aug. 17, 2017

(51) Int. Cl.
| F25C 5/08 | (2006.01) |
| F25D 17/06 | (2006.01) |
| F16C 17/02 | (2006.01) |
| F16C 19/16 | (2006.01) |
| F16C 19/36 | (2006.01) |
| F16C 21/00 | (2006.01) |
| F25C 1/147 | (2018.01) |
| F25D 11/02 | (2006.01) |
| F25D 23/02 | (2006.01) |
| F25D 23/04 | (2006.01) |
| F16C 35/067 | (2006.01) |
| F16C 35/073 | (2006.01) |

(52) U.S. Cl.
CPC .............. *F25C 1/147* (2013.01); *F16C 21/00* (2013.01); *F16C 35/067* (2013.01); *F16C 35/073* (2013.01); *F25C 5/08* (2013.01); *F25D 11/02* (2013.01); *F25D 17/065* (2013.01); *F25D 23/028* (2013.01); *F25D 23/04* (2013.01); *F16C 17/02* (2013.01); *F16C 19/166* (2013.01); *F16C 19/361* (2013.01); *F16C 2362/52* (2013.01); *F25D 2323/021* (2013.01); *F25D 2700/122* (2013.01)

(58) Field of Classification Search
CPC .. F25C 1/147; F25C 5/08; F16C 17/10; F16C 35/073; F16C 21/00; F16C 19/361; F16C 19/166; F16C 17/02; F25D 11/02; F25D 23/028; F25D 17/065; F25D 23/04; F25D 2700/122; F25D 2323/021
USPC .......................................................... 62/344
See application file for complete search history.

(56) References Cited

U.S. PATENT DOCUMENTS

| 2,713,790 A * | 7/1955 | Barber .................. G01N 11/14 73/54.28 |
| 3,214,935 A | 11/1965 | Conto |
| 3,226,944 A * | 1/1966 | Connors .................. F25C 1/04 62/137 |

(Continued)

FOREIGN PATENT DOCUMENTS

JP        08068375 A *  3/1996  ............ F01C 21/102

*Primary Examiner* — Kun Kai Ma
(74) *Attorney, Agent, or Firm* — Dority & Manning, P.A.

(57) ABSTRACT

An ice maker includes a casing that defines a chamber. The casing extends between a top portion and a bottom portion. An extruder die is mounted to the casing at the top portion of the casing. An auger is disposed within the chamber of the casing. A radial sleeve bearing engages the auger at the bottom portion of the casing. A radial and thrust bearing engages the auger at the extruder die. A related refrigerator appliance is also provided.

16 Claims, 5 Drawing Sheets

(56) References Cited

U.S. PATENT DOCUMENTS

| | | | | |
|---|---|---|---|---|
| 3,256,710 A | * | 6/1966 | Dedricks | F25C 1/147 62/320 |
| 3,371,505 A | * | 3/1968 | Raver | F25C 1/147 62/320 |
| 4,167,895 A | * | 9/1979 | Rubinstein | F04B 1/324 91/506 |
| 4,741,173 A | * | 5/1988 | Neumann | F25C 1/147 62/298 |
| 5,109,679 A | * | 5/1992 | Hida | F25C 1/147 241/DIG. 17 |
| 5,123,260 A | | 6/1992 | Althoff et al. | |
| 5,160,290 A | * | 11/1992 | Richburg | A22C 17/04 241/24.16 |
| 5,421,713 A | * | 6/1995 | Backus | A21C 1/06 366/77 |
| 2013/0276472 A1 | * | 10/2013 | Mitchell | F25C 1/147 62/344 |

* cited by examiner

ICE MAKER WITH A RADIAL AND THRUST BEARING

FIELD OF THE INVENTION

The present subject matter relates generally to auger-style ice makers.

BACKGROUND OF THE INVENTION

Certain refrigerator appliances include an ice maker. To produce ice, liquid water is directed to the ice maker and frozen. A variety of ice types can be produced depending upon the particular ice maker used. For example, certain ice makers include a mold body for receiving liquid water. An auger within the mold body can rotate and scrape ice off an inner surface of the mold body to form ice nuggets. Such ice makers are generally referred to as nugget style ice makers. Certain consumers prefer nugget style ice makers and their associated ice nuggets.

Rotating the auger within the mold body poses certain challenges. For example, the auger can apply a large force onto a wall of mold body when the auger rotates and scrapes ice off the inner surface of the mold body. In turn, a bearing can be subjected to significant wear due to the large force applied by the auger, and the wear can generate debris that contaminates ice within the mold body.

Accordingly, an ice maker with features for limiting a force appliance by an auger onto a mold body during rotation of the auger within the mold body would be useful.

BRIEF DESCRIPTION OF THE INVENTION

The present subject matter provides an ice maker. The ice maker includes a casing that defines a chamber. The casing extends between a top portion and a bottom portion. An extruder die is mounted to the casing at the top portion of the casing. An auger is disposed within the chamber of the casing. A radial sleeve bearing engages the auger at the bottom portion of the casing. A radial and thrust bearing engages the auger at the extruder die. A related refrigerator appliance is also provided. Additional aspects and advantages of the invention will be set forth in part in the following description, or may be apparent from the description, or may be learned through practice of the invention.

In a first exemplary embodiment, an ice maker is provided. The ice maker includes a casing defines a chamber. The casing extends between a top portion and a bottom portion. An extruder die is mounted to the casing at the top portion of the casing. An auger is disposed within the chamber of the casing. A radial sleeve bearing engages the auger at the bottom portion of the casing. A radial and thrust bearing engages the auger at the extruder die.

In a second exemplary embodiment, a refrigerator appliance is provided. The refrigerator appliance includes a housing that defines a chilled compartment. An ice maker is disposed within the housing. The ice maker includes a casing that defines a chamber. The casing extends between a top portion and a bottom portion. An extruder die is mounted to the casing at the top portion of the casing. An auger is disposed within the chamber of the casing. A radial sleeve bearing engages the auger at the bottom portion of the casing. A radial and thrust bearing engages the auger at the extruder die.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
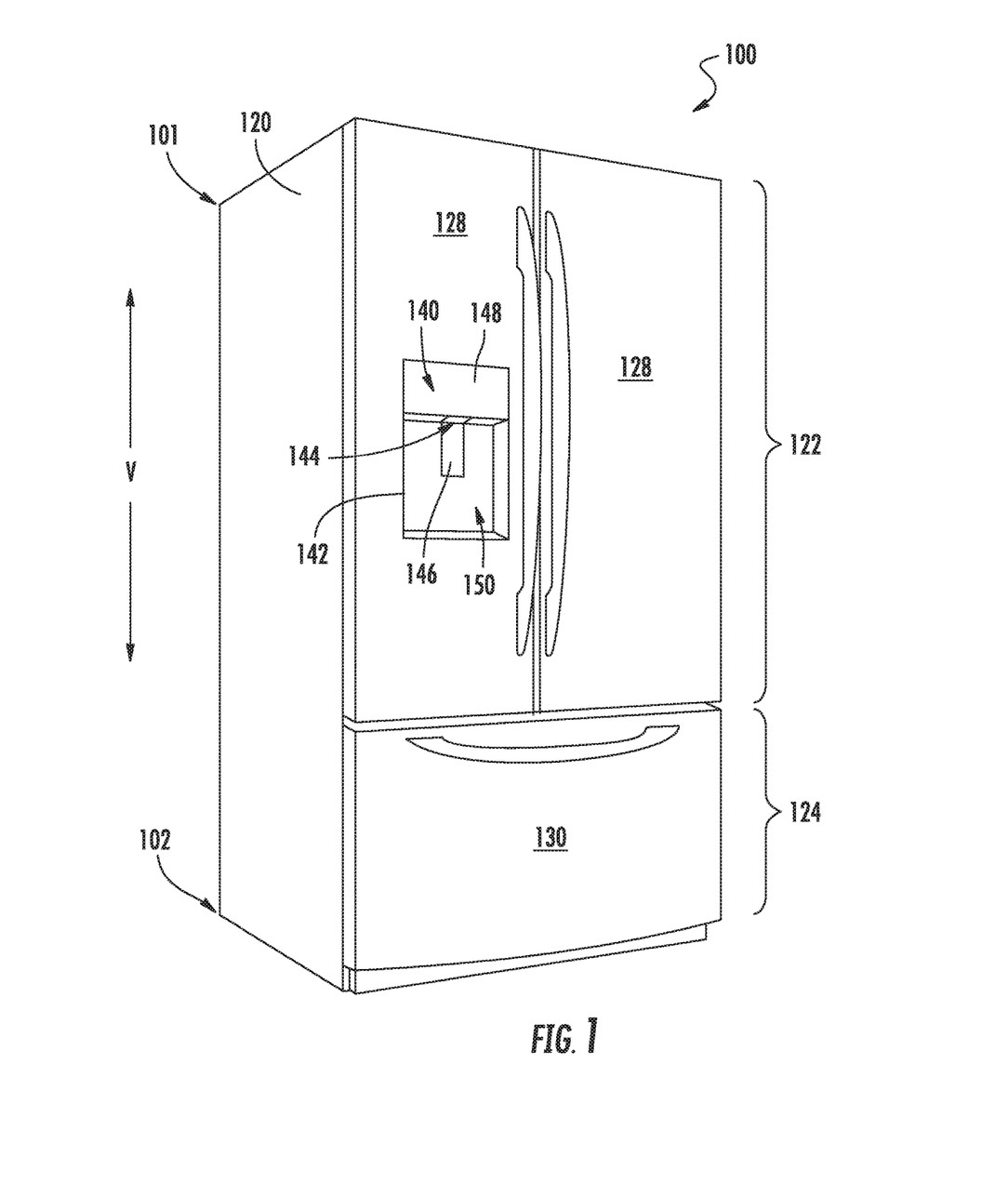
FIG. 1 provides a perspective view of a refrigerator appliance according to an exemplary embodiment of the present subject matter.

FIG. 1 provides a perspective view of a refrigerator appliance 100 according to an exemplary embodiment of the present subject matter. Refrigerator appliance 100 includes a cabinet or housing 120 that extends between a top 101 and a bottom 102 along a vertical direction V. Housing 120 defines chilled chambers for receipt of food items for storage. In particular, housing 120 defines fresh food chamber 122 positioned at or adjacent top 101 of housing 120 and a freezer chamber 124 arranged at or adjacent bottom 102 of housing 120. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance or a standalone ice-maker appliance. Consequently, the description set forth herein is for illustrative purposes only and is not intended to be limiting in any aspect to any particular refrigerator chamber configuration.

Refrigerator doors 128 are rotatably hinged to an edge of housing 120 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in the closed configuration in FIG. 1.

Refrigerator appliance 100 also includes a dispensing assembly 140 for dispensing liquid water and/or ice. Dispensing assembly 140 includes a dispenser 142 positioned on or mounted to an exterior portion of refrigerator appliance 100, e.g., on one of doors 120. Dispenser 142 includes a discharging outlet 144 for accessing ice and liquid water. An actuating mechanism 146, shown as a paddle, is mounted below discharging outlet 144 for operating dispenser 142. In alternative exemplary embodiments, any suitable actuating mechanism may be used to operate dispenser 142. For example, dispenser 142 can include a sensor (such as an ultrasonic sensor) or a button rather than the paddle. A user interface panel 148 is provided for controlling the mode of operation. For example, user interface panel 148 includes a plurality of user inputs (not labeled), such as a water dispensing button and an ice-dispensing button, for selecting a desired mode of operation such as crushed or non-crushed ice.

Discharging outlet 144 and actuating mechanism 146 are an external part of dispenser 142 and are mounted in a dispenser recess 150. Dispenser recess 150 is positioned at a predetermined elevation convenient for a user to access ice or water and enabling the user to access ice without the need to bend-over and without the need to open doors 120. In the exemplary embodiment, dispenser recess 150 is positioned at a level that approximates the chest level of a user.

Figure 2:
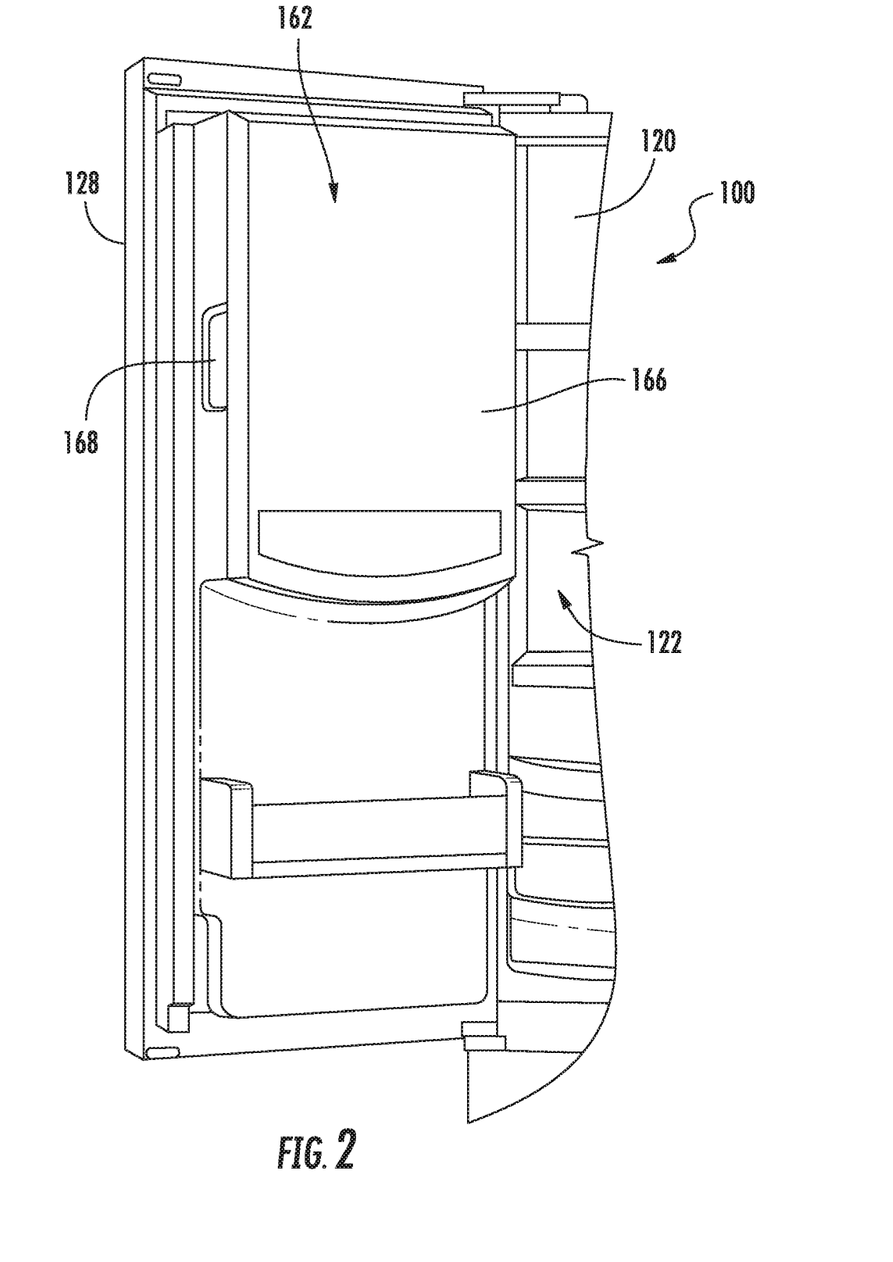
FIG. 2 provides a perspective view of a door of the exemplary refrigerator appliance of FIG. 1.

FIG. 2 provides a perspective view of a door of refrigerator doors 128. Refrigerator appliance 100 includes a sub-compartment 162 defined on refrigerator door 128. Sub-compartment 162 is often referred to as an "icebox." Sub-compartment 162 extends into fresh food chamber 122 when refrigerator door 128 is in the closed position. As discussed in greater detail below, an ice maker or ice making assembly 160 and an ice storage bin 164 (FIG. 3) are positioned or disposed within sub-compartment 162. Thus, ice is supplied to dispenser recess 150 (FIG. 1) from the ice making assembly 160 and/or ice storage bin 164 in sub-compartment 162 on a back side of refrigerator door 128. Chilled air from a sealed system (not shown) of refrigerator appliance 100 may be directed into components within sub-compartment 162, e.g., ice making assembly 160 and/or ice storage bin 164. In certain exemplary embodiments, a temperature air within sub-compartment 162 may correspond to a temperature of air within fresh food chamber 122, such that ice within ice storage bin 164 melts over time.

An access door 166 is hinged to refrigerator door 128. Access door 166 permits selective access to sub-compartment 162. Any manner of suitable latch 168 is configured with sub-compartment 162 to maintain access door 166 in a closed position. As an example, latch 168 may be actuated by a consumer in order to open access door 166 for providing access into sub-compartment 162. Access door 166 can also assist with insulating sub-compartment 162, e.g., by thermally isolating or insulating sub-compartment 162 from fresh food chamber 122.

Figure 3:
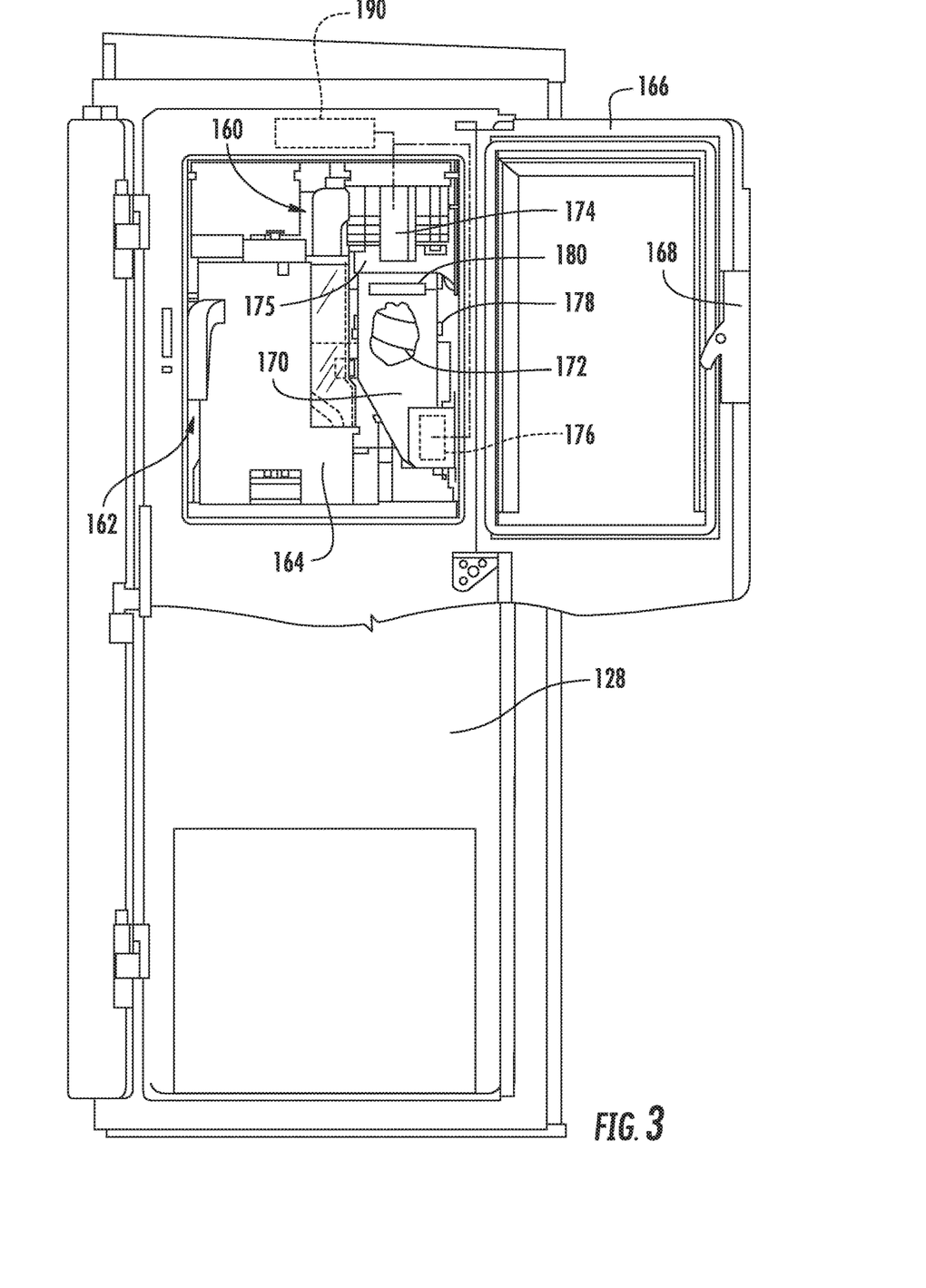
FIG. 3 provides an elevation view of the door of the exemplary refrigerator appliance of FIG. 2 with an access door of the door shown in an open position.

FIG. 3 provides an elevation view of refrigerator door 128 with access door 166 shown in an open position. As may be seen in FIG. 3, ice making assembly 160 is positioned or disposed within sub-compartment 162. Ice making assembly 160 includes a mold body or casing 170. An auger 172 is rotatably mounted in a mold body within casing 170 (shown partially cutout to reveal auger 172). In particular, a motor 174 is mounted to casing 170 and is in mechanical communication with (e.g., coupled to) auger 172. Motor 174 is configured for selectively rotating auger 172 in the mold body within casing 170. During rotation of auger 172 within the mold body, auger 172 scrapes or removes ice off an inner surface of the mold body within casing 170 and directs such ice to an extruder 175. At extruder 175, ice nuggets are formed from ice within casing 170. An ice bucket or ice storage bin 164 is positioned below extruder 175 and receives the ice nuggets from extruder 175. From ice storage bin 164, the ice nuggets can enter dispensing assembly 140 and be accessed by a user as discussed above. In such a manner, ice making assembly 160 can produce or generate ice nuggets.

Ice making assembly 160 also includes a fan 176. Fan 176 is configured for directing a flow of chilled air towards casing 170. As an example, fan 176 can direct chilled air from an evaporator of a sealed system through a duct to casing 170. Thus, casing 170 can be cooled with chilled air from fan 176 such that ice making assembly 160 is air cooled in order to form ice therein. Ice making assembly 160 also includes a heater 180, such as an electric resistance heating element, mounted to casing 170. Heater 180 is configured for selectively heating casing 170, e.g., when ice prevents or hinders rotation of auger 172 within casing 170.

Operation of ice making assembly 160 is controlled by a processing device or controller 190, e.g., that may be operatively coupled to control panel 148 for user manipulation to select features and operations of ice making assembly 160. Controller 190 can operates various components of ice making assembly 160 to execute selected system cycles and features. For example, controller 190 is in operative communication with motor 174, fan 176 and heater 180. Thus, controller 190 can selectively activate and operate motor 174, fan 176 and heater 180.

Controller 190 may include a memory and microprocessor, such as a general or special purpose microprocessor operable to execute programming instructions or micro-control code associated with operation of ice making assembly 160. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 190 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Motor 174, fan 176 and heater 180 may be in communication with controller 190 via one or more signal lines or shared communication busses.

Ice making assembly 160 also includes a temperature sensor 178. Temperature sensor 178 is configured for measuring a temperature of casing 170 and/or liquids, such as liquid water, within casing 170. Temperature sensor 178 can be any suitable device for measuring the temperature of casing 170 and/or liquids therein. For example, temperature sensor 178 may be a thermistor or a thermocouple. Controller 190 can receive a signal, such as a voltage or a current, from temperature sensor 190 that corresponds to the temperature of the temperature of casing 170 and/or liquids therein. In such a manner, the temperature of casing 170 and/or liquids therein can be monitored and/or recorded with controller 190.

Figure 4:
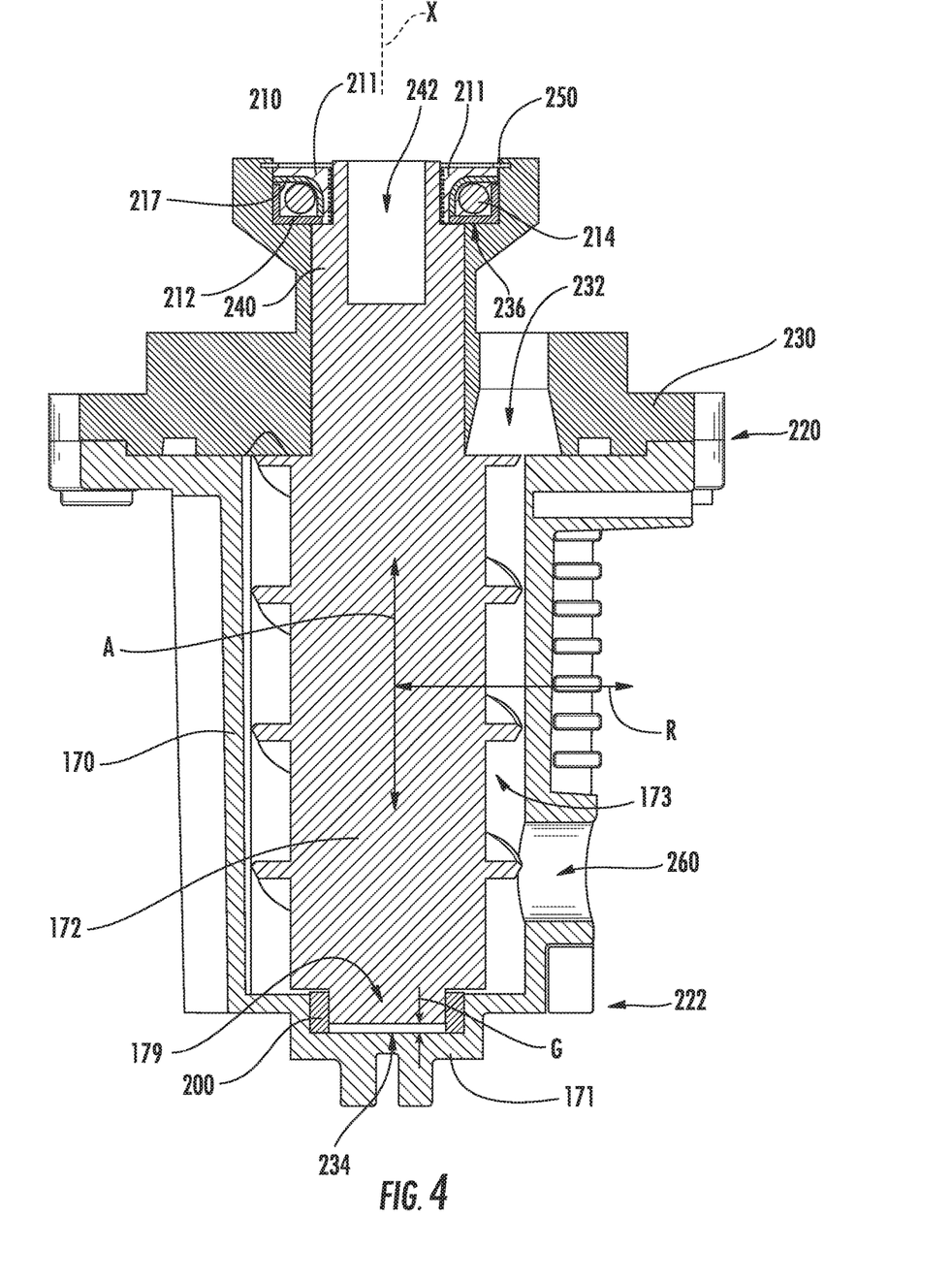
FIG. 4 provides a section view of certain components of an ice making assembly of the exemplary refrigerator appliance of FIG. 2.
Figure 5:
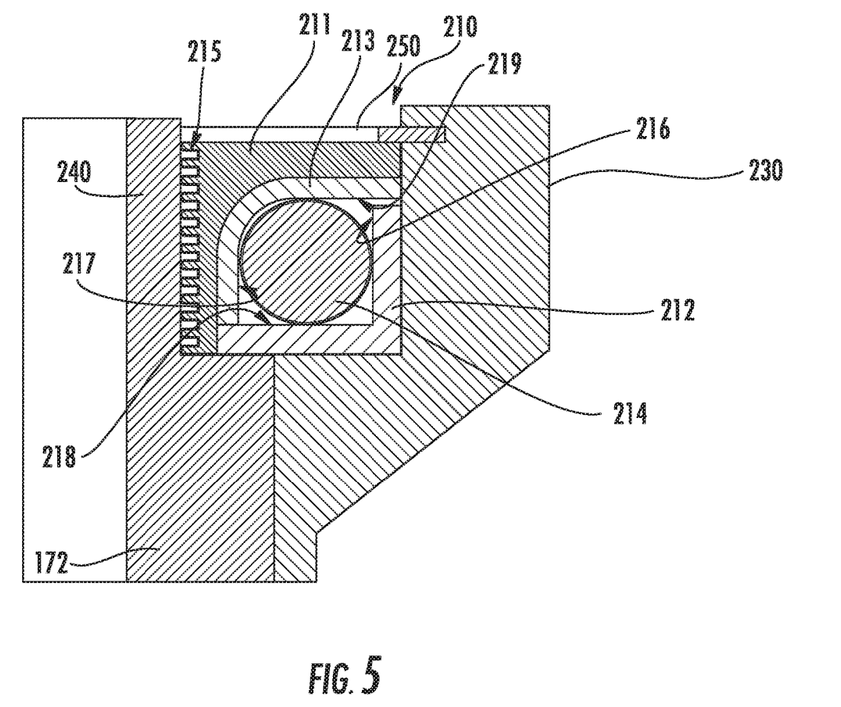
FIG. 5 provides a partial, section view of a radial and thrust bearing of the ice making assembly of FIG. 4.

FIG. 4 provides a section view of certain components of ice making assembly 160. FIG. 5 provides a partial, section view of a radial and thrust bearing 210 of ice making assembly 160. As discussed above, ice making assembly 160 includes casing 170 and auger 172. During rotation of auger 172 within casing 170, auger 172 scrapes or removes ice off an inner surface of casing 170 and directs such ice to extruder 175. Such action of auger 172 can generate a downward force on auger 172 and urges auger 172 towards a bottom wall 171 of casing 170. Ice making assembly 160 includes features for limiting or obstructing linear motion of auger 172 relative to casing 170, e.g., motion of auger 172 towards bottom wall 171 of casing 170. Such features are discussed in greater detail below in the context of FIG. 4.

As may be seen in FIG. 4, ice making assembly 160 includes a radial sleeve bearing 200 and radial and thrust bearing 210. Radial sleeve bearing 200 and radial and thrust bearing 210 assist with regulating motion of auger 172 relative to casing 170, as discussed in greater detail below. Radial sleeve bearing 200 and radial and thrust bearing 210 may be positioned at or adjacent opposite ends of casing 170. For example, casing 170 extends between a top portion 220 and a bottom portion 222. Radial sleeve bearing 200 is positioned at and engages auger 172 at bottom portion 222 of casing 170. Conversely, radial and thrust bearing 210 is positioned proximate, e.g., above, top portion 220 of casing 170. In particular, radial and thrust bearing 210 may be positioned at and engage auger 172 at an extruder die 230 that includes converging extruding openings 232. Extruder die 230 is mounted to casing 170 at or adjacent top portion 220 of casing 170. Extruder die 230 may function as a cover or seal for a chamber 173 defined by casing 170 in which auger 172 is disposed. Thus, radial and thrust bearing 210 may be positioned above radial sleeve bearing 200, as shown in FIG. 4.

Auger 172 is rotatable on an axis of rotation X within chamber 173 of casing 170. Radial sleeve bearing 200 obstructs or limits movement of auger 172 relative to casing 170 along a direction perpendicular to the axis of rotation X, e.g., while allowing relatively free movement of auger 172 along the axis of rotation X. Thus, radial sleeve bearing 200 may limit radial movement of a distal end portion 179 of auger 172 within chamber 173 of casing 170. Radial sleeve bearing 200 may include an annular plastic, such as polytetrafluoroethylene (PTFE), bearing that extends circumferentially around auger 172 at distal end portion 179 of auger 172 and also extends along a radial direction R between casing 170 and auger 172 at distal end portion 179 of auger 172. In particular, radial sleeve bearing 200 may be received within a bearing pocket 234 defined by casing 170 on bottom wall 171 of casing 170 (e.g., and that corresponds to a lowest portion of chamber 173 of casing 170). Radial sleeve bearing 200 may extend along the radial direction R between casing 170 and auger 172 within bearing pocket 234 on bottom wall 171 of casing 170. Radial sleeve bearing 200 may also assist with centering distal end portion 179 of auger 172 on the axis of rotation X. The axis of rotation X may be vertical or substantially (e.g., within ten degrees of) vertical in certain exemplary embodiments.

Radial and thrust bearing 210 obstructs or limits movement of auger 172 relative to casing 170 along both the axis of rotation X and the direction perpendicular to the axis of rotation X. Thus, radial and thrust bearing 210 may limit radial and axial movement of auger 172 within chamber 173 of casing 170. As shown in FIGS. 4 and 5, radial and thrust bearing 210 includes a retaining nut or washer 211, an outer race 212, an inner race 213 and plurality of bearings 214. Washer 211 is positioned at and mounted to auger 172. For example, washer 211 may be threaded to auger 172 at a threaded connection 215 such that washer 211 is fixed relative to auger 172 when washer 211 is mounted to auger 172. Thus, washer 211 may rotate with auger 172 during operation of ice making assembly 160.

Outer race 212 is positioned at and mounted to extruder die 230, and inner race 213 is positioned at and mounted to washer 211. Inner race 213 may be fixed relative to washer 211 when inner race 213 is mounted to washer 211. Thus, inner race 213 may rotate with washer 211 and auger 172 during operation of ice making assembly 160. Conversely, outer race 212 may be fixed relative to extruder die 230 when outer race 212 is mounted to extruder die 230. Thus, outer race 212 may not rotate with washer 211 and auger 172 during operation of ice making assembly 160. Outer and inner races 212, 213 (and washer 211) may also extend circumferentially around a shaft 240 of auger 172, which has a socket 242. Outer and inner races 212, 213 may also be spaced apart from each other such that outer and inner races 212, 213 do not contact each other.

Bearings 214 are positioned between outer and inner races 212, 213 and extend between outer and inner races 212, 213. Bearings 214 may include spherical bearings or cylindrical bearings. Thus, outer and inner races 212, 213 may rotate relative to each other on bearings 214 while also limiting movement of auger 172 relative to casing 170 along both the axis of rotation X and the direction perpendicular to the axis of rotation X. In particular, auger 172 defines an axial direction A and a radial direction R that are perpendicular to each other. Outer race 212 has a radial bearing surface 216 and an axial bearing surface 218, and inner race 213 has a radial bearing surface 217 and an axial bearing surface 219. Bearings 214 extends between radial bearing surface 216 of outer race 212 and radial bearing surface 217 of inner race 213 along the radial direction R, and bearings 214 also extend between axial bearing surface 218 of outer race 212 and axial bearing surface 219 of inner race 213 along the axial direction A. Thus, bearings 214 may transfer forces along the radial direction R and axial direction A between outer and inner races 212, 213, as discussed in greater detail below.

Radial and thrust bearing 210 may be received within a bearing pocket 236 defined by extruder die 230 above casing 170. Thus, radial and thrust bearing 210 may be positioned above chamber 173 of casing 170 with extruder die 230 disposed between radial and thrust bearing 210 and casing 170 along the axial direction A. In such a manner, contamination of water within chamber 173 of casing 170 from lubricating grease on bearings 214 may be blocked or limited.

Radial and thrust bearing 210 may mounted or attached to extruder die 230 with a retainer clip 250. Retainer clip 250 is disposed above washer 211 and is positioned to block upward movement of washer 211 and/or inner race 213 relative to extruder die 230. For example, washer 211 may contact retainer clip 250, and washer 211 may also extend downwardly from retainer clip 250 to inner race 213 along the axial direction A. Washer 211 may also be compressed onto inner race 213 along the axial direction A with threaded connection 215 to assist with applying downward force along the axial direction A onto inner race 213. As discussed above, bearings 214 extend along the axial direction A between outer and inner races 212, 213. In turn, outer race 212 may extend downwardly along the axial direction A from bearings 214 to extruder die 230 (e.g., a bottom surface of bearing pocket 236) and/or auger 172. In such a manner, radial and thrust bearing 210 may extend along the axial direction A between retainer clip 250 and extruder die 230 in order to limit movement of auger 172 relative to casing 170 along the axis of rotation X.

In a similar manner, outer race 212 may extend along the radial direction R from extruder die 230 (e.g., a side wall of bearing pocket 236) to bearings 214. As discussed above, bearings 214 extend along the radial direction R between outer and inner races 212, 213. In turn, inner race 213 may also extend along the radial direction R from bearings 214 to washer 211, and washer 211 may contact auger 172, e.g., shaft 240 of auger 172. In such a manner, radial and thrust bearing 210 may extend along the radial direction R between extruder die 230 and auger 172 in order to limit movement of auger 172 relative to casing 170 along the direction perpendicular to the axis of rotation X.

As shown in FIG. 4, bottom wall 171 of casing 170 is spaced apart from distal end portion 179 of auger 172 along the axial direction A by a gap G. By limiting downward motion of auger 172 along the axial direction A towards bottom wall 171 of casing 170, radial and thrust bearing 210 assists with maintaining the gap G between distal end portion 179 of auger 172 and bottom wall 171 of casing 170. In such a manner, rubbing or wear between auger 172 and casing 170 can be limited or avoided and performance of ice making assembly 160 can be improved.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An ice maker, comprising:
   a casing defining a chamber, the casing extending between a top portion and a bottom portion, the chamber of the casing fillable with liquid water;
   an extruder die mounted to the casing at the top portion of the casing;
   an auger disposed within the chamber of the casing;
   a radial sleeve bearing received within the casing, the radial sleeve bearing engaging the auger at the bottom portion of the casing; and
   a radial and thrust bearing disposed above the casing within a pocket defined by the extruder die, the radial and thrust bearing engaging the auger at the extruder die,
   wherein the auger is rotatable on an axis of rotation within the chamber of the casing, the radial sleeve bearing obstructing movement of the auger relative to the casing along a direction perpendicular to the axis of rotation, the radial and thrust bearing obstructing movement of the auger relative to the casing along both the axis of rotation and the direction perpendicular to the axis of rotation,
   wherein the extruder die is disposed between the radial and thrust bearing and the casing along the axis of rotation such that the radial and thrust bearing is positioned over and spaced from the chamber of the casing along the axis of rotation within the extruder die and such that the extruder die blocks contaminant flow from the radial and thrust bearing into the chamber of the casing,
   wherein the auger extends from the motor to a bottom end of the auger, the bottom end of the auger positioned with the casing and having a bottom face, and the bottom face of the auger is spaced apart from a bottom wall of the casing at the bottom portion of the casing so that the bottom face of the auger does not contact the bottom wall of the casing, and
   wherein the radial sleeve bearing is received within a bearing pocket defined by the casing on the bottom wall of the casing, the bearing pocket corresponding to a bottommost portion of the chamber of the casing, the radial sleeve bearing engaging the bottom end of the auger within the bearing pocket, the bottom wall of the casing being imperforate below the bearing pocket and the auger.

2. The ice maker of claim 1, wherein the radial sleeve bearing comprises an annular plastic bearing that extends between the casing and the auger at the bottom portion of the casing.

3. The ice maker of claim 1, wherein the radial and thrust bearing comprises:
   a washer positioned at and mounted to the auger;
   an outer race positioned at and mounted to the extruder die;
   an inner race positioned at and mounted to the washer; and
   a plurality of bearings extending between the outer and inner races.

4. The ice maker of claim 3, wherein the washer is threaded to the auger such that the washer is fixed relative to the auger.

5. The ice maker of claim 3, wherein the outer and inner races are spaced apart from each other.

6. The ice maker of claim 3, wherein the auger defines an axial direction and a radial direction that are perpendicular to each other, the outer and inner races each having a radial bearing surface and an axial bearing surface, the bearings of the plurality of bearings extending between the radial bearing surface of the outer race and the radial bearing surface of the inner race along the radial direction, the bearings of the plurality of bearings extending between the axial bearing surface of the outer race and the axial bearing surface of the inner race along the axial direction.

7. The ice maker of claim 3, wherein the bearings of the plurality of bearings comprise spherical bearings or cylindrical bearings.

8. The ice maker of claim 3, wherein the radial and thrust bearing further comprises a retainer clip mounted to the extruder die above the washer, the retainer clip position to block upward movement of the washer relative to the extruder die.

9. A refrigerator appliance comprising:
   a housing defining a chilled compartment;
   an ice maker disposed within the housing, the ice maker comprising
   a casing defining a chamber, the casing extending between a top portion and a bottom portion, the chamber of the casing fillable with liquid water;
   an extruder die mounted to the casing at the top portion of the casing;
   a motor positioned above the extruder die;
   an auger disposed within the chamber of the casing, the auger coupled to the motor such that the auger is rotatable with the motor;
   a radial sleeve bearing received within the casing, the radial sleeve bearing engaging the auger at the bottom portion of the casing; and
   a radial and thrust bearing disposed above the casing within a pocket defined by the extruder die, the radial and thrust bearing engaging the auger at the extruder die, wherein the auger is rotatable on an axis of rotation within the chamber of the casing, the radial sleeve bearing obstructing movement of the auger relative to the casing along a direction perpendicular to the axis of rotation, the radial and thrust bearing obstructing movement of the auger relative to the casing along both the axis of rotation and the direction perpendicular to the axis of rotation, wherein the extruder die is disposed between the radial and thrust bearing and the casing along the axis of rotation such that the radial and thrust bearing is positioned over and spaced from the chamber of the casing along the axis of rotation within the extruder die and such that the extruder die blocks contaminant flow from the radial and thrust bearing into the chamber of the casing, wherein the auger extends from the motor to a bottom end of the auger, the bottom end of the auger positioned with the casing and having a bottom face, and the bottom face of the auger is spaced apart from a bottom wall of the casing at the bottom portion of the casing so that the bottom face of the auger does not contact the bottom wall of the casing, and wherein the radial sleeve bearing is received within a bearing pocket defined by the casing on the bottom wall of the casing, the bearing pocket corresponding to a bottommost portion of the chamber of the casing, the radial sleeve bearing engaging the bottom end of the auger within the bearing pocket, the bottom wall of the casing being imperforate below the bearing pocket and the auger.

10. The refrigerator appliance of claim 9, wherein the radial sleeve bearing comprises an annular plastic bearing that extends between the casing and the auger at the bottom portion of the casing.

11. The refrigerator appliance of claim 9, wherein the radial and thrust bearing comprises:
   a washer positioned at and mounted to the auger;
   an outer race positioned at and mounted to the extruder die;
   an inner race positioned at and mounted to the washer; and
   a plurality of bearings extending between the outer and inner races.

12. The refrigerator appliance of claim 11, wherein the washer is threaded to the auger such that the washer is fixed relative to the auger.

13. The refrigerator appliance of claim 11, wherein the outer and inner races are spaced apart from each other.

14. The refrigerator appliance of claim 11, wherein the auger defines an axial direction and a radial direction that are perpendicular to each other, the outer and inner races each having a radial bearing surface and an axial bearing surface, the bearings of the plurality of bearings extending between the radial bearing surface of the outer race and the radial bearing surface of the inner race along the radial direction, the bearings of the plurality of bearings extending between the axial bearing surface of the outer race and the axial bearing surface of the inner race along the axial direction.

15. The refrigerator appliance of claim 11, wherein the bearings of the plurality of bearings comprise spherical bearings or cylindrical bearings.

16. The refrigerator appliance of claim 11, wherein the radial and thrust bearing further comprises a retainer clip mounted to the extruder die above the washer, the retainer clip position to block upward movement of the washer relative to the extruder die.

* * * * *